United States Patent
Lingo, Jr. et al.

(10) Patent No.: US 12,003,211 B2
(45) Date of Patent: Jun. 4, 2024

(54) TRACKING SOLAR PANEL STAND

(71) Applicant: DFI Enterprises, Inc., Morrisville, NY (US)

(72) Inventors: Lowell Edwin Lingo, Jr., Morrisville, NY (US); Benjamin Andrew Strohman, Henrietta, NY (US)

(73) Assignee: DFI Enterprises, Morrisville, NY (US)

( * ) Notice: Subject to any disclaimer, the term of this patent is extended or adjusted under 35 U.S.C. 154(b) by 0 days.

(21) Appl. No.: 17/902,032

(22) Filed: Sep. 2, 2022

(65) Prior Publication Data

US 2024/0079993 A1    Mar. 7, 2024

(51) Int. Cl.
| | |
|---|---|
| *H02S 30/10* | (2014.01) |
| *H02S 20/32* | (2014.01) |
| *F24S 25/10* | (2018.01) |
| *F24S 25/632* | (2018.01) |
| *F24S 30/00* | (2018.01) |
| *F24S 30/40* | (2018.01) |
| *F24S 30/455* | (2018.01) |
| *F24S 50/20* | (2018.01) |

(52) U.S. Cl.
CPC .............. *H02S 30/10* (2014.12); *H02S 20/32* (2014.12); *F24S 25/10* (2018.05); *F24S 25/632* (2018.05); *F24S 2030/115* (2018.05); *F24S 2030/131* (2018.05); *F24S 2030/136* (2018.05); *F24S 2030/145* (2018.05); *F24S 30/40* (2018.05); *F24S 30/455* (2018.05); *F24S 50/20* (2018.05)

(58) Field of Classification Search
CPC .......... H02S 30/10; H02S 20/32; F24S 25/10; F24S 25/632; F24S 30/40; F24S 30/455; F24S 50/20; F24S 2030/115; F24S 2030/131; F24S 2030/136; F24S 2030/145

See application file for complete search history.

(56) References Cited

U.S. PATENT DOCUMENTS

| | | | |
|---|---|---|---|
| 2013/0048048 A1* | 2/2013 | Flanery ................. | F24S 40/20 136/246 |
| 2014/0041710 A1* | 2/2014 | Hwang ............... | H01L 31/0521 136/246 |
| 2020/0195191 A1* | 6/2020 | Melton ................... | H02S 20/32 |

* cited by examiner

*Primary Examiner* — Michael Y Sun
(74) *Attorney, Agent, or Firm* — Michael R. Kahn (57) ABSTRACT

Disclosed embodiments provide apparatuses and techniques for use and construction of a two-axis solar tracking device that closely approximates the efficiency of Vertical Biaxial Trackers but with simplified construction, and thus are cost competitive with uniaxial horizontal tracking systems. The flexible mounting system can accommodate both photovoltaic and solar thermal panels. Disclosed embodiments provide a solar panel stand that provides biaxial tracking for solar energy generation efficiency, with reduced cost and complexity, enabling more off-grid and micro-grid energy generation capabilities.

11 Claims, 13 Drawing Sheets

TRACKING SOLAR PANEL STAND

FIELD

The present invention relates generally to solar energy generation, and more particularly, to a tracking solar panel stand.

BACKGROUND

Solar panels can be used to generate electricity. The electricity produced is a form of renewable, or 'green' energy. Solar panels can be comprised of multiple photovoltaic cells. Each photovoltaic cell is basically a sandwich made up of two slices of semi-conducting material. The photovoltaic cells allow photons, or particles of light from the sun, to knock electrons free from atoms, generating a flow of electricity. In addition to photovoltaic cells, thermodynamic panels, which are solar thermal panels, are devices that absorb the sun's heat and use it to heat up water. In particular, flat-plate collectors have a form factor similar to solar photovoltaic panels. They are composed of a dark absorbing surface, a transparent cover, a heat insulating backing and, a fluid that transports heat from the absorber to a water tank. The absorber can be made of different materials, namely polymers, copper, aluminum or steel.

Solar power is well suited for remote areas that are not connected to energy grids. Solar energy can drastically improve the quality of life for millions of people who live in the dark, and especially in places such as Sub-Saharan Africa, where as many as 90% of the rural population lacks access to electricity. People in these areas must rely on fuel-based lighting, which inflicts significant social and environmental costs, from jeopardized health through contamination of indoor air, to limited overall productivity. Thus, solar energy offers advantages to conventional fossil fuels and other renewable energy systems.

SUMMARY

In one embodiment, there is provided a solar panel stand, comprising: a plurality of vertical supports; a horizontal support beam moveably coupled to the plurality of vertical supports; a plurality of lateral arms protruding from the horizontal support beam; and a plurality of solar panels, wherein each solar panel of the plurality of solar panels is moveably mounted on a lateral arm from the plurality of lateral arms, and wherein each solar panel of the plurality of solar panels has a mounting offset that is unequal to a mounting offset of an adjacent solar panel of the plurality of solar panels.

In another embodiment, there is provided solar panel stand, comprising: a plurality of vertical supports; a horizontal support beam moveably coupled to the plurality of vertical supports; a plurality of lateral arms protruding from the horizontal support beam; a plurality of panel frames moveably attached to each lateral arm of the plurality of lateral arms; and a plurality of solar panels, wherein each solar panel of the plurality of solar panels is installed within a panel frame from the plurality of panel frames, and wherein each frame of the plurality of panel frames has a mounting offset that is unequal to a mounting offset of an adjacent solar panel of the plurality of solar panels.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide innovative apparatuses and techniques to decrease the cost of solar collection while increasing its efficiency with a low-part-count panel mounting frame that can accept most types of Photovoltaic (PV) and Thermal-Solar (TS) panels allowing two axis tracking of the sun and panel inversion for clearing of snow or debris. Disclosed embodiments provide hybrid PV/TS collection on a single tracker, eliminating the problem of balancing hardware for hot water collection based on the seasonal variation of both solar energy availability and hot water usage.

Disclosed embodiments provide the capability to significantly increase the efficiency of direct solar energy generation and usage. To maximize efficiency, two-axis tracking can be used. However, often times, two-axis tracking is deemed too expensive, and thus, is rare. Disclosed embodiments make two-axis tracking feasible by sacrificing a small amount of efficiency to enable simplifying the design, to significantly reduce the cost and complexity. Disclosed embodiments also allow inversion of the panel array to dump snow or other debris further increasing efficiency. Affordable tracking can shift the paradigm of micro-generation at solar-farms to pico-generation at the point of use. Local arrays can also provide renewable and reliable stand-by power when the grid is down.

A solar panel mounted in a "fixed" position on the earth is not fixed in relation to the sun because it is rotating about the polar axis of the earth every 24 hours, and also because this axis is not perpendicular to the plane of the earth's orbit about the sun, thus causing a continual change in declination, that is the maximum height the sun reaches each day at the panel location. This depends on the latitude of the panel location, as well as the date within the year. So, in order to keep the direction of the sun's rays perpendicular to the panel throughout the day, it requires two-axis tracking; one to compensate the large magnitude of the change in angle as the panel rotates on the surface of the earth from sunrise to sunset (the hour angle), and a second to account for the much less dramatic seasonal change (declination angle).

A fixed position panel is inexpensive to install because there are no moving parts required. They can be fixed at any number of points about their frame to any existing surface such as a roof-top. There is little maintenance required other than keeping the surface clean (especially in areas subject to snow). However, the great disadvantage is that they typically deliver only 60% or less of their potential.

The first of the two axes tracking includes adding a declination axis, D, to the system by providing a controlled means of rotating the horizontal beam about its own axis. This one-axis control is not necessarily complex or expensive because the change in the declination is both slow and of limited range (±23.5° from latitude annually), thus, automatic control is not necessary. Manual adjustment of the declination on a weekly, monthly, or even seasonal basis will add a significant increase in efficiency to any solar system. Thus, disclosed embodiments are equipped with a tilting adjustment for manual realignment as the seasons come and go. They may operate via cable and winch, threaded rod, or simply a friction clamp and hand tilt.

Tracking the hour angle of the sun provides greater benefit in efficiency, but because of the rapid change in movement in comparison to declination tracking, it will require the added cost and complexity of some automated movement. The best axis to use for hour angle tracking will also depend on the latitude of the panel installation. For example, at the equator, tracking the hour angle 180° (06:00 to 12:00) on a north-south axis can provide excellent results, but at the poles (assuming a sunny day), tracking 360° about a vertical axis coincident with the polar axis would be best.

Disclosed embodiments provide apparatuses and techniques for use and construction of a two-axis solar tracking device that closely approximates the efficiency of Vertical Biaxial Trackers but do not require the large concrete base, and thus are cost competitive with uniaxial horizontal tracking systems. The flexible mounting system can accommodate both photovoltaic and solar thermal panels.

Figure 1:
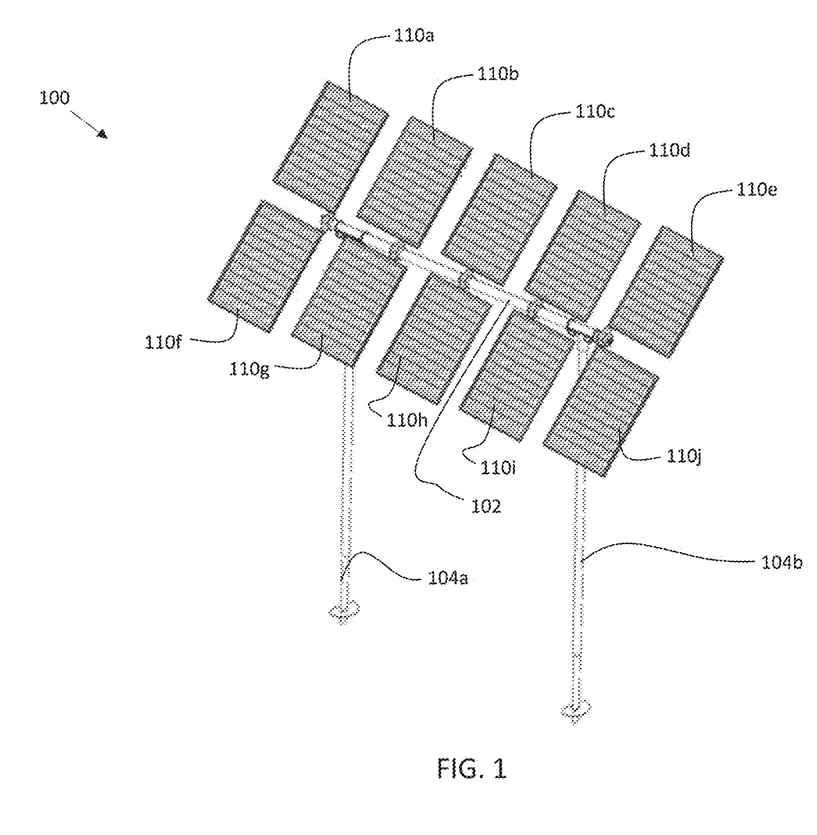
FIG. 1 shows a perspective view of a solar panel stand in accordance with embodiments of the present invention.

FIG. 1 shows a perspective view of a solar panel stand 100 in accordance with embodiments of the present invention in an operational position. Solar panel stand 100 includes a plurality of solar panels, indicated as 110a-110j, mounted on horizontal support beam 102. A plurality of lateral arms (shown in FIG. 4) rotatably support the panels 110a-110j. A plurality of vertical supports, indicated as 104a and 104b, support the horizontal support beam 102. The vertical supports 104a and 104b may be embedded in the ground, installed on a weighted base, or installed in any other suitable manner. Note that while two vertical supports 104a and 104b are shown in FIG. 1, other embodiments may have more or fewer vertical supports. In some embodiments, all the solar panels are the same size. In some embodiments, the plurality of vertical supports is two vertical supports.

Figure 2A:
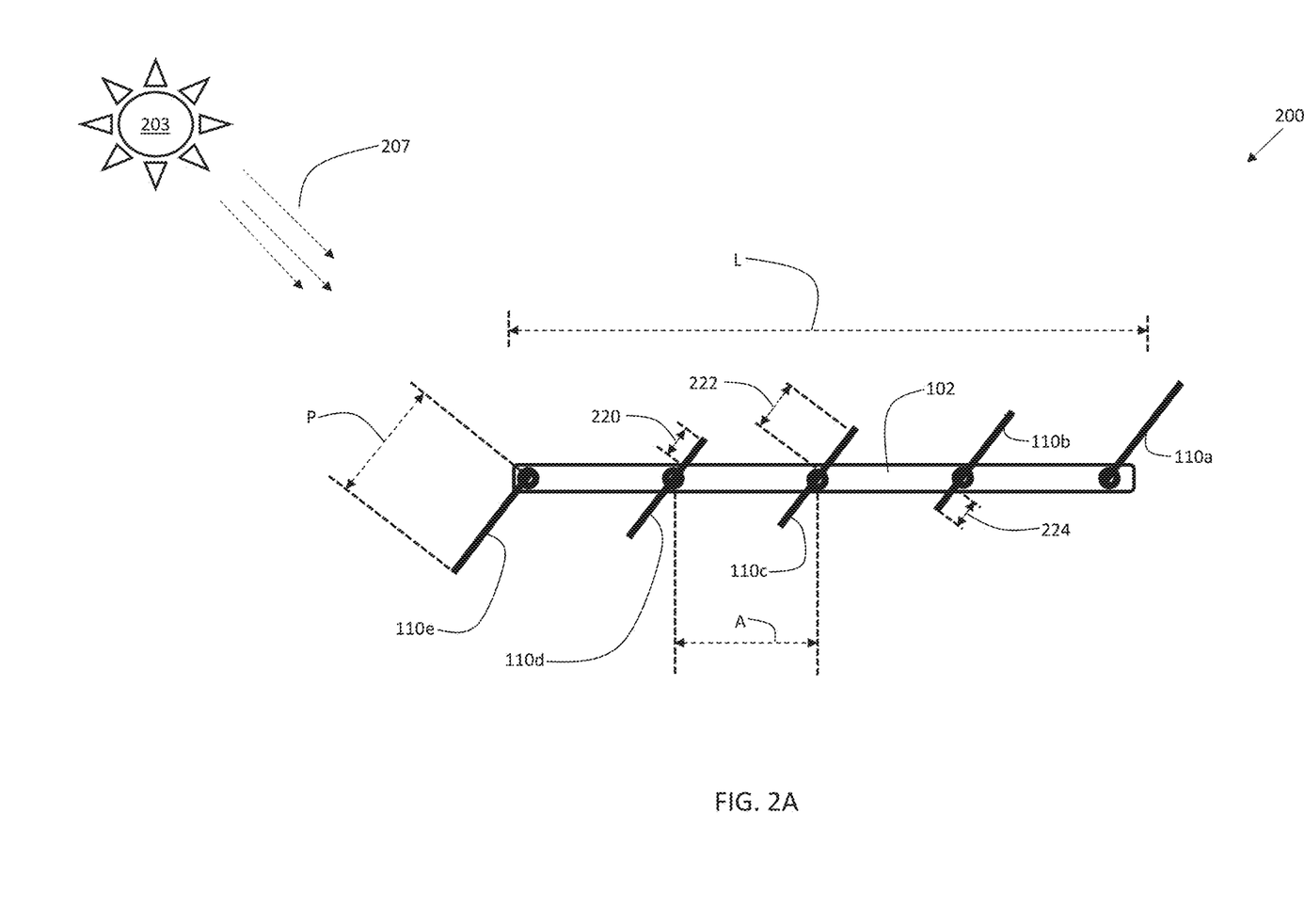
FIG. 2A shows a side view indicating panel placement.

FIG. 2A shows a side view 200 indicating panel placement. In FIG. 2, the horizontal support beam 102 is shown, along with solar panels 110a-110e as shown in FIG. 1. In embodiments, the length L of the horizontal support beam 102 is defined as $L=A*(N-1)+M$, where A is the spacing between lateral arms, N is the number of lateral arms, and M is an overhead margin.

In embodiments, the distance A between adjacent arms is defined as $P+P/(N-1)$. As an example, with a panel width P of 1 meter, and a value of N as 5, which is depicted in FIG. 2, A can be computed as $A=1+\frac{1}{4}, =1.25$ meters.

Continuing with the example, then the length L of horizontal support beam 102 is defined as:

$$L=A*(N-1)+M=1.25*(4)+0.2=5.2 \text{ meters.}$$

In embodiments, each solar panel of the plurality of solar panels has a mounting offset that is unequal to a mounting offset of an adjacent solar panel of the plurality of solar panels. This provides efficiency improvements by reducing shadows of a panel incident upon an adjacent panel. A central point of the horizontal support beam is in the middle of the horizontal support beam, equidistant from each end of the horizontal support beam. Panel 110c, mounted at a central point on horizontal support beam 102, has a mounting offset 222 that is half the value of P. That is, offset 222 is half the width of a panel. In contrast, adjacent panel 110d has a mounting offset 220, where mounting offset 220 is less than mounting offset 222. Similarly, mounting offset 224 of panel 110b is less than mounting offset 220. In embodiments, mounting offset 220 equals mounting offset 224. However, mounting offset 220 is located above horizontal support beam 102, while mounting offset 224 is located below horizontal support beam 102. The end panels, 110e and 110a have a mounting offset of zero.

As the sun, indicated at 203 appears to move across the sky during the course of a day, the angle of the light rays 207 emanating from the sun changes as well. In embodiments, the panels rotate during the course of the day, to increase the efficiency by maintaining an approximately perpendicular angle with the light rays 207.

The orientation shown in FIG. 2A improves efficiency by reducing shadows caused by adjacent panels. This is due to the varying mounting offsets of adjacent panels. In embodiments, the number of arms is odd. In the embodiment of FIG. 2A, the number of arms is five. In embodiments, one of the arms, which is supporting panel 110c is mounted at a central point of the horizontal support beam. In embodiments, the lateral arm mounted at the central point is affixed to a solar panel from the plurality of solar panels with a mounting offset that is half a width of the solar panel. In embodiments, the lateral arm spacing is defined by the panel width plus the quotient of the panel width divided by one less than the number of lateral arms.

Figure 2B:
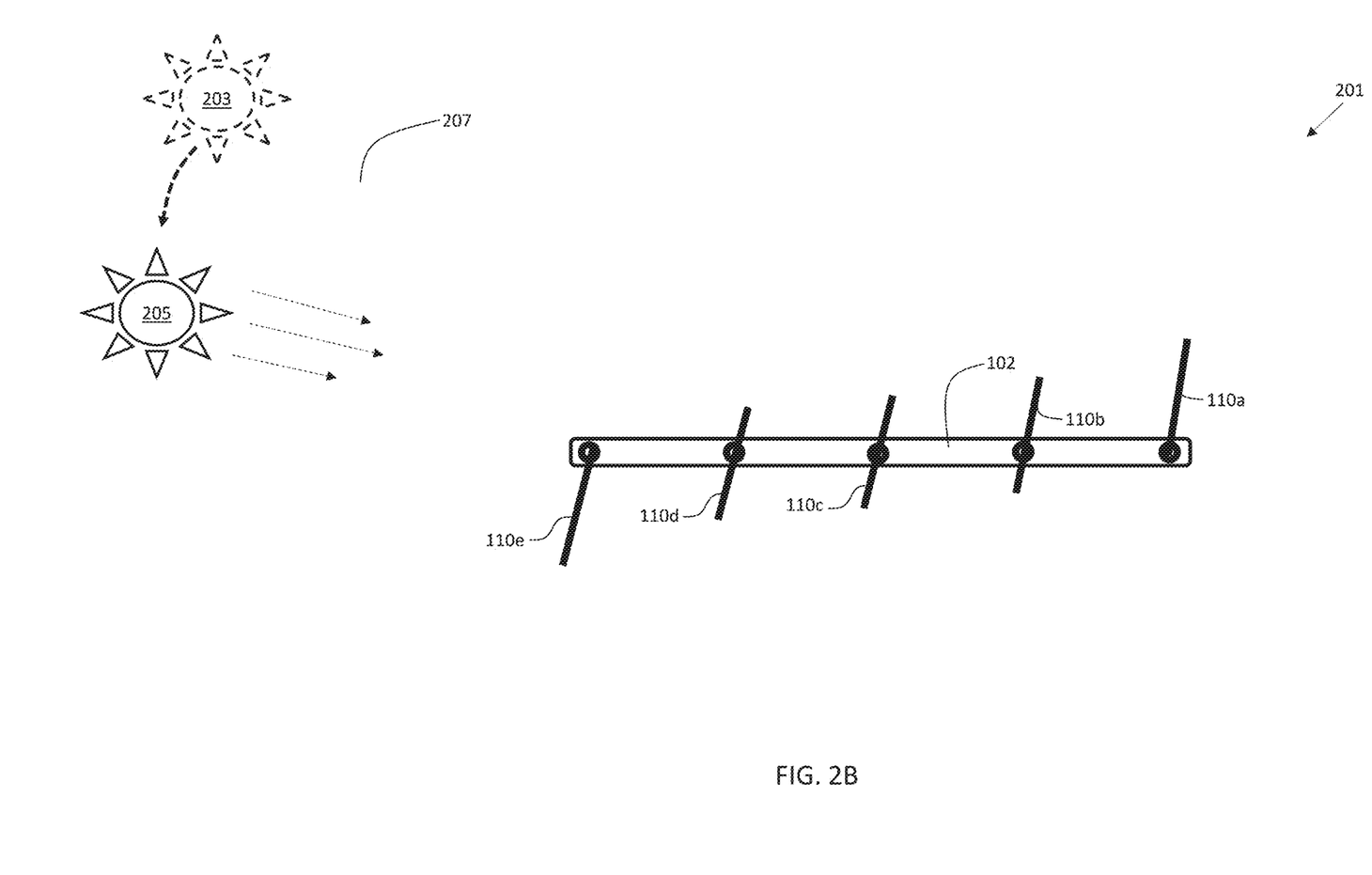
FIG. 2B shows a side view indicating a different panel placement.

FIG. 2B shows a side view 201 indicating a different panel placement. In this view, as compared with that of FIG. 2A, the sun indicated at 205 is in a lower relative position from sun position indicated at 203, changing the angle of emanated light rays 207, the panels 110a-110e can be rotated, in order to maintain an orientation that receives direct sunlight at an approximately perpendicular orientation with respect to rays 207.

Figure 3:
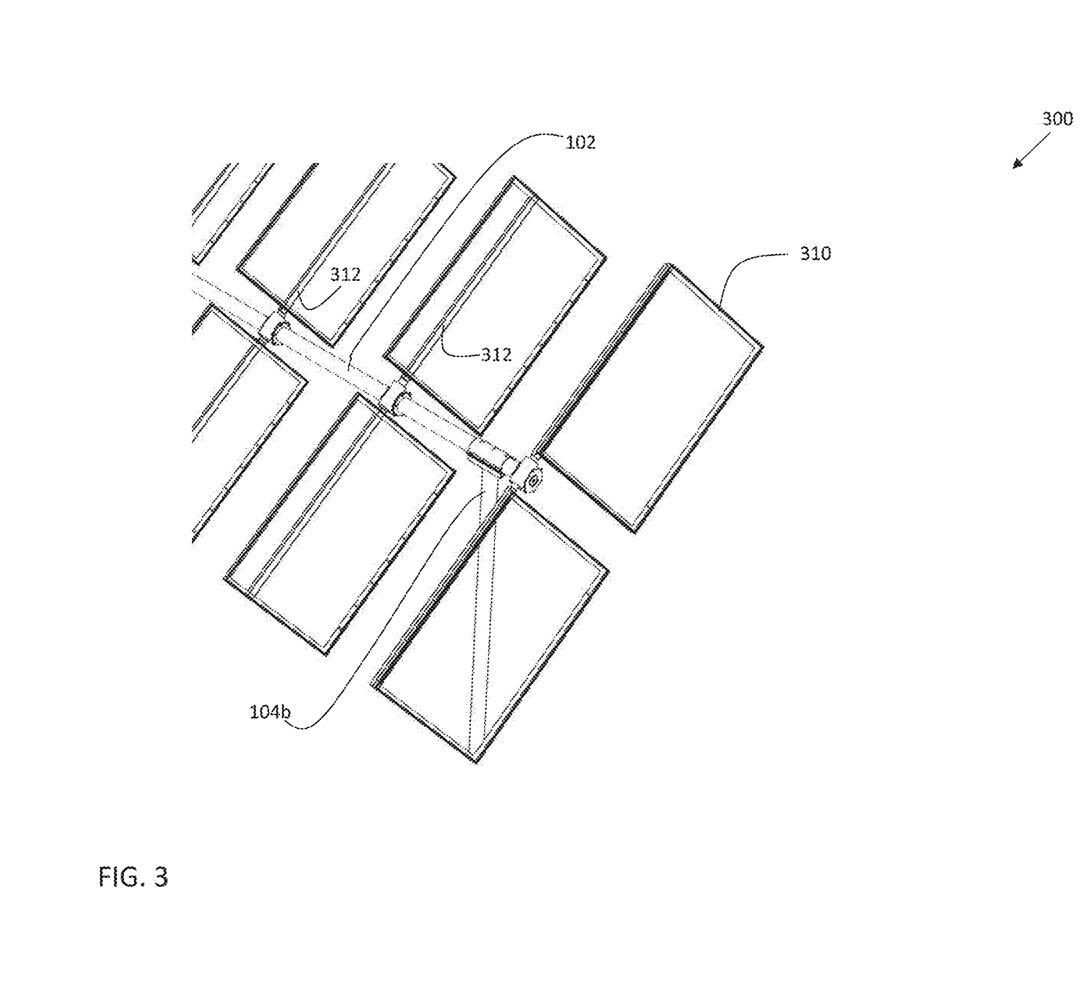
FIG. 3 shows a perspective view with panel frames.

FIG. 3 shows a perspective view 300 with panel frames, without any panels installed. As can be seen in this view, panel frames, indicated generally as 310, are mounted on each lateral arm, indicated generally as 312. Solar panels, such as photovoltaic panels (PV), and/or thermodynamic panels (TS), can be mounted within the panel frames 310. This enables dual operation modes, where either electricity generation or water heating can be accomplished with disclosed embodiments.

Some embodiments include a solar panel stand comprising: a plurality of vertical supports; a horizontal support beam moveably coupled to the plurality of vertical supports; a plurality of lateral arms protruding from the horizontal support beam; a plurality of panel frames moveably attached to each lateral arm of the plurality of lateral arms; and a plurality of solar panels, wherein each solar panel of the plurality of solar panels is installed within a panel frame from the plurality of panel frames, and wherein each frame of the plurality of panel frames has a mounting offset that is unequal to a mounting offset of an adjacent solar panel of the plurality of solar panels.

Figure 4:
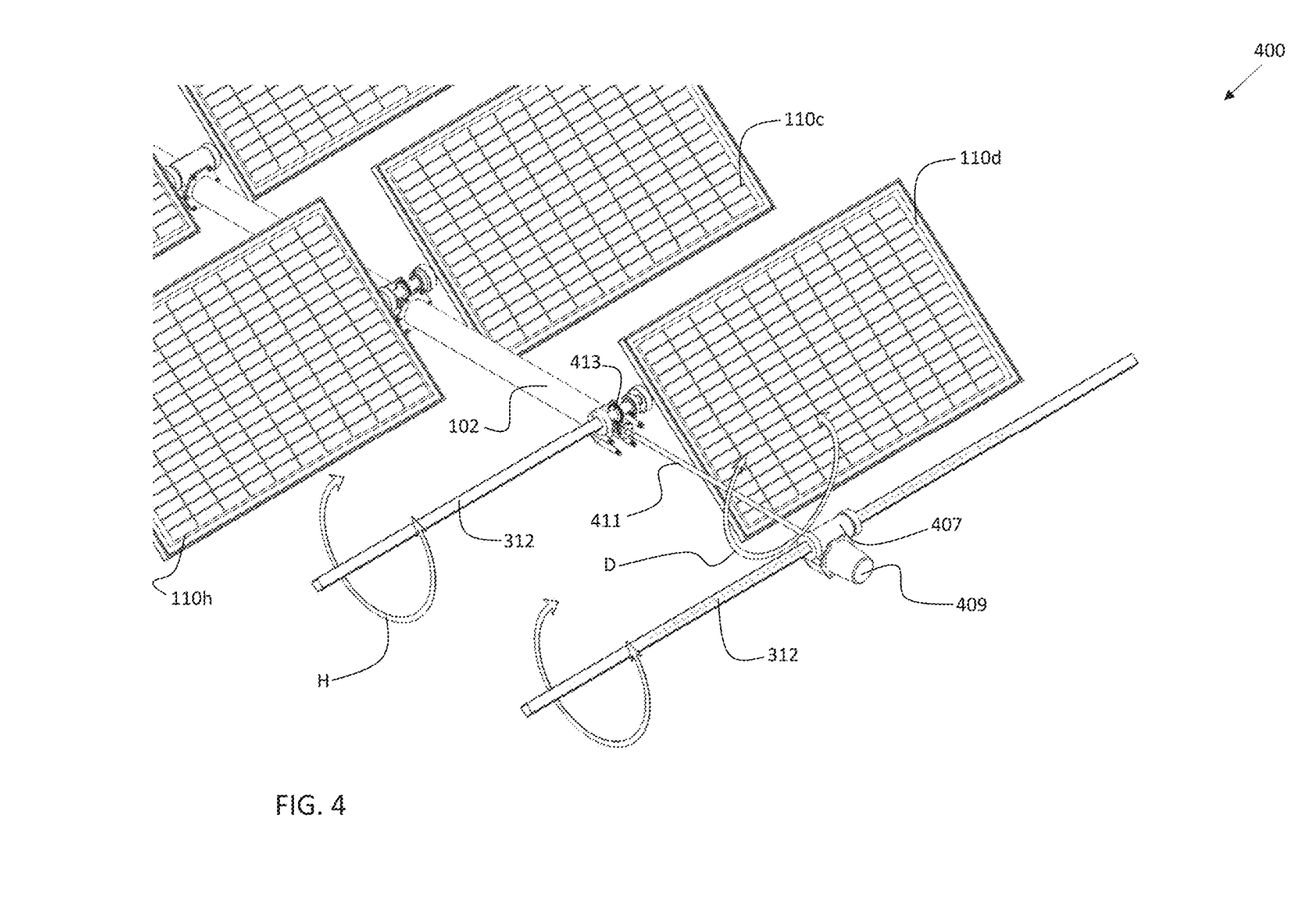
FIG. 4 shows details of lateral arms.

FIG. 4 shows a detailed view 400 showing lateral arms, by removal of three panels. In FIG. 4, two lateral arms, indicated as 312, can be seen. Each lateral arm 312 traverses a mechanical coupling, indicated generally as 407. In embodiments, a horizontal (hr-angle) motor 409 is mechanically coupled to the plurality of lateral arms 312. In embodiments, a drive shaft 411 is contained within horizontal support beam 102, and engages with a gearbox, an example of which is shown at 413, that is housed within each mechanical coupling 407. The hr-angle motor 409 turns the drive shaft 411 in order to change the angle of connected panels, such as 110d. Thus, embodiments can include a hr-angle motor, the hr-angle motor mechanically coupled to the plurality of lateral arms. The hr-angle motor 409 enables changing the angle, as indicated by arrow H. In embodiments, each lateral arm moves in a synchronized manner, such that, as the sun changes position throughout the course of a day, the hr-angle position of the panels can be adjusted (uniformly and in unison). In embodiments, the motor 409 may be operated on a timer, such that the panels gradually change the hr-angle throughout the course of a day, as illustrated by the transition depicted between FIG. 2A and FIG. 2B.

Additionally, the declination angle, can be changed by allowing rotation of the horizontal support beam 102 in the direction indicated by the arrow D. The declination angle corresponds to the declination of the sun over the course of a year, and as such, need not be changed as frequently. In some embodiments, the declination angle may be changed weekly or monthly to track the sun angle throughout the year. In some embodiments, the declination angle may be changed via a motor. In other embodiments, the declination angle may be changed manually.

Figure 5:
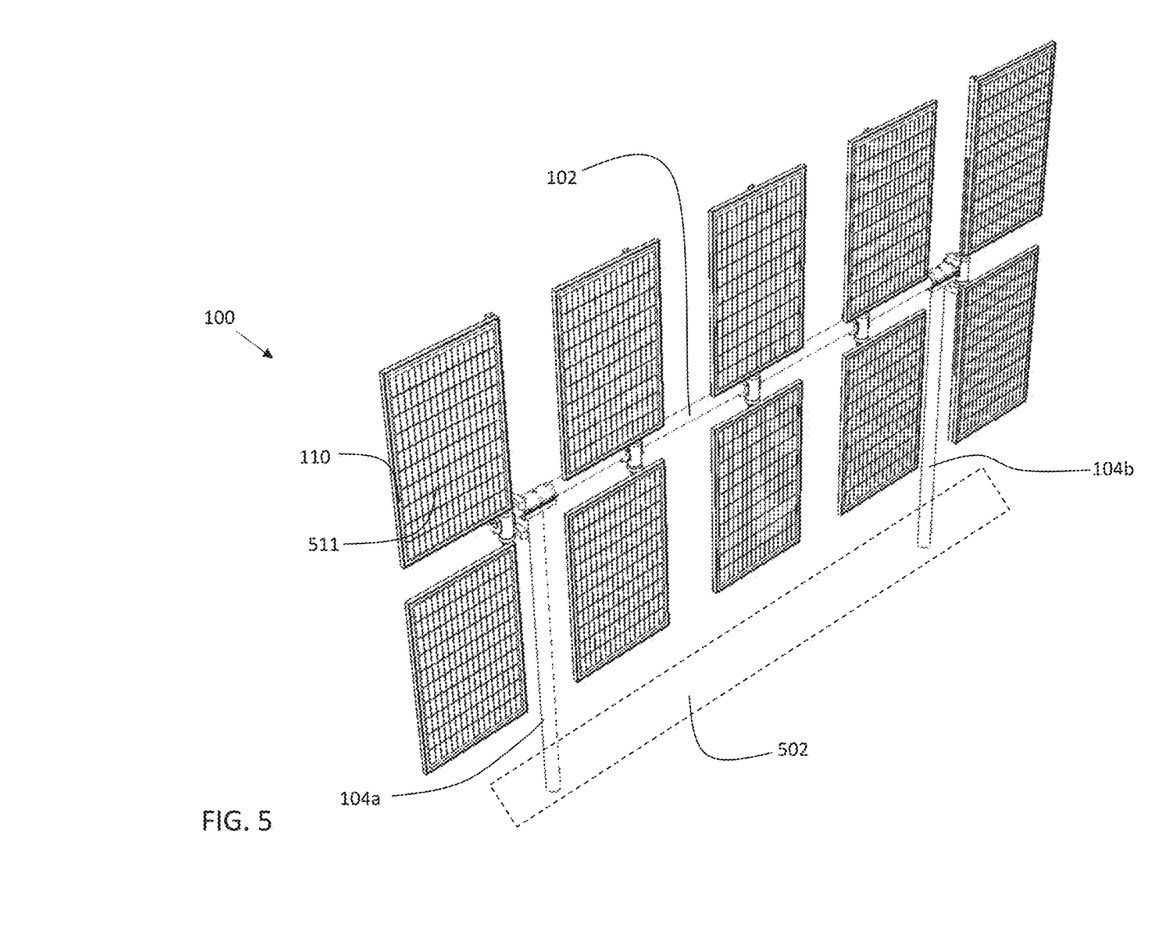
FIG. 5 shows a perspective view of a solar panel stand in accordance with embodiments of the present invention.

FIG. 5 shows a perspective view of a solar panel stand 100 in accordance with embodiments of the present invention. In comparison with FIG. 1, which depicts solar panel stand 100 in an operational position, in FIG. 5, solar panel stand 100 is in a vertical configuration. In the vertical configuration, the planar surface 511 of each panel 110 is approximately perpendicular to a ground plane 502. This configuration is useful for protecting the panels against heavy snow. By moving to the vertical configuration prior to, and/or during heavy snow, the amount of weight on the stand, lateral arms, and panels, due to snow, is reduced, thereby protecting the panels. Thus, in embodiments, the solar panel stand is capable of going into a vertical configuration, wherein each solar panel of the plurality of panels has its planar surface approximately perpendicular to a ground plane.

Figure 6:
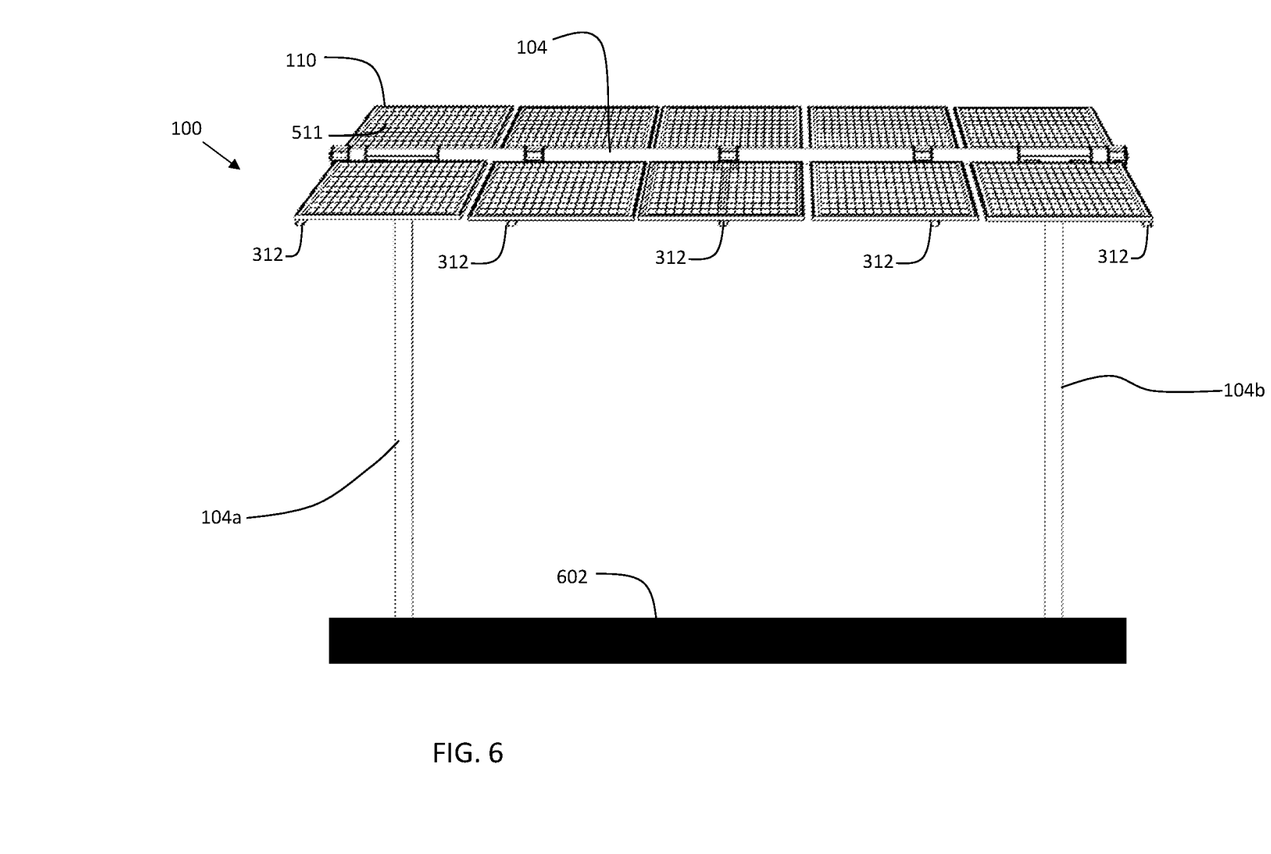
FIG. 6 shows a perspective view of a solar panel stand in accordance with embodiments of the present invention.

FIG. 6 shows a perspective view of a solar panel stand 100 in accordance with some embodiments of the present invention. In comparison with FIG. 1, which depicts solar panel stand 100 in an operational position, in FIG. 6, solar panel stand 100 is in a canopy configuration. In the canopy configuration, the planar surface 511 of each panel 110 is approximately parallel to a ground plane 602. This configuration is useful for protecting the panels against strong winds. By moving to the canopy configuration prior to strong winds, the surface area incident to wind is reduced, thereby protecting the panels. Additionally, the canopy mode can provide shade to an area. While leaving the solar panel stand 100 in a canopy configuration throughout the day is less efficient than tracking the sun, it can provide shade to an area, while still generating solar energy. Thus, in embodiments, the solar panel stand is capable of going into a canopy configuration, wherein each solar panel of the plurality of panels has its planar surface approximately parallel to a ground plane.

Figure 7:
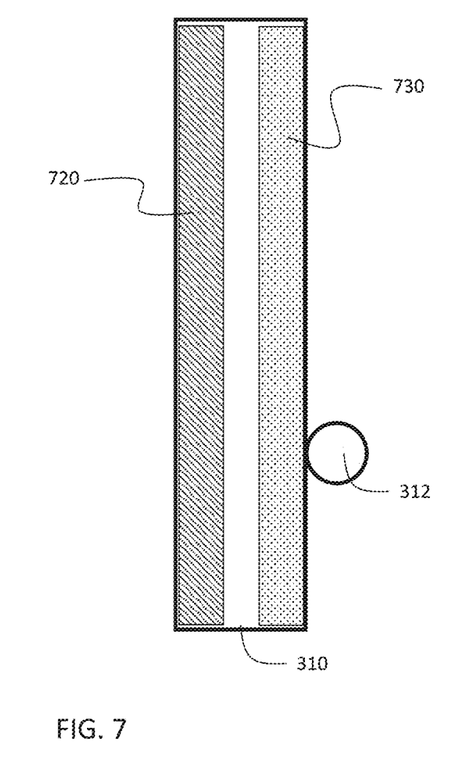
FIG. 7 shows two panels within a frame.

FIG. 7 shows two panels within a frame. The frame 310 is rotatably mounted to lateral arm 312. Within the frame 310, a photovoltaic (PV) solar panel 720 comprising photovoltaic cells is mounted on one side (a first side), and a thermodynamic (TS) solar panel 730 is mounted on the opposite side (a second side). The thermodynamic solar panels 730 can be used to heat water with solar energy, and the photovoltaic solar panels 720 can be used to generate electricity. The solar panel stands of disclosed embodiments can be configured to have a first side of the frame or a second side of the frame in the sunlight, depending on the desired type of solar energy to use.

Some embodiments include a second plurality of solar panels, wherein each solar panel of the second plurality of solar panels is installed within a panel frame from the plurality of panel frames. In some embodiments, the plurality of solar panels comprises photovoltaic cells, and the second plurality comprises thermodynamic panels.

Figure 8:
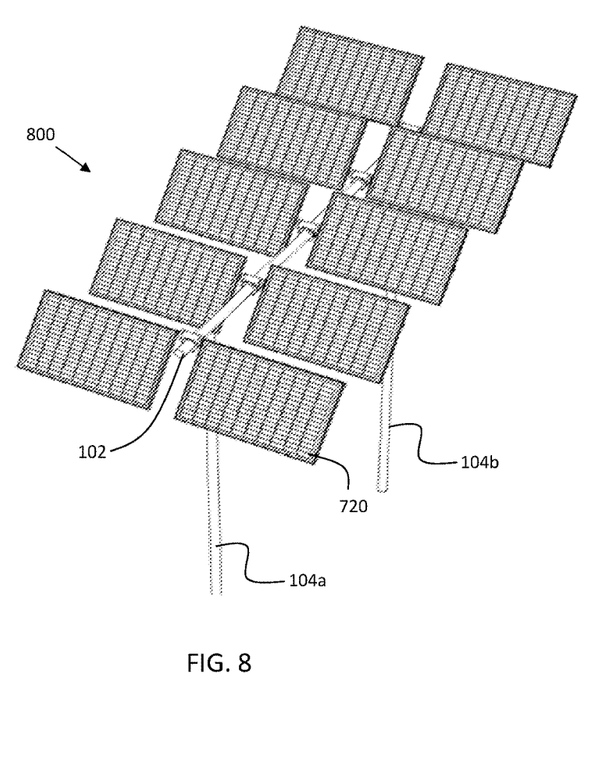
FIG. 8 shows a perspective view of a solar panel stand in accordance with embodiments of the present invention.

FIG. 8 shows a perspective view of a solar panel stand 800 in accordance with embodiments of the present invention. Solar panel stand 800 is shown in an electricity generating configuration, exposing photovoltaic solar panels, indicated generally as 720, to sunlight.

Figure 9:
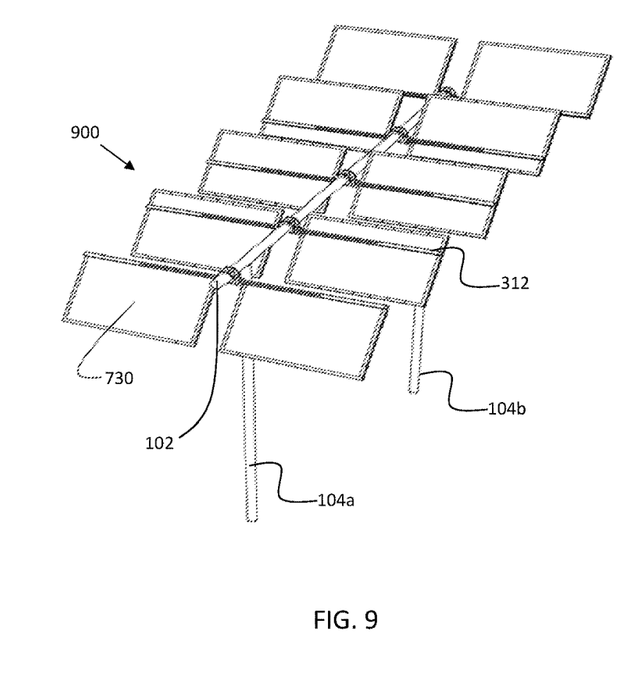
FIG. 9 shows a perspective view of a solar panel stand in accordance with embodiments of the present invention.

FIG. 9 shows a perspective view of a solar panel stand 900 in accordance with some embodiments of the present invention. Solar panel stand 900 is shown in a thermodynamic configuration, exposing thermodynamic solar panels, indicated generally as 730, to sunlight. This embodiment can be used to heat a fluid within the panels 730, which can in turn heat water. This alleviates the problem of over-designing thermal-solar systems for summer use by requiring added capacity to get sufficient hot water during the winter months because with this invention, the same number of panels can be used and the seasonal adjustment can simply be made by timing the panels' exposure to the sun for longer periods when less sun is available. Additionally, the tracking capability of the system will increase per panel hot water production very significantly.

Figure 10:
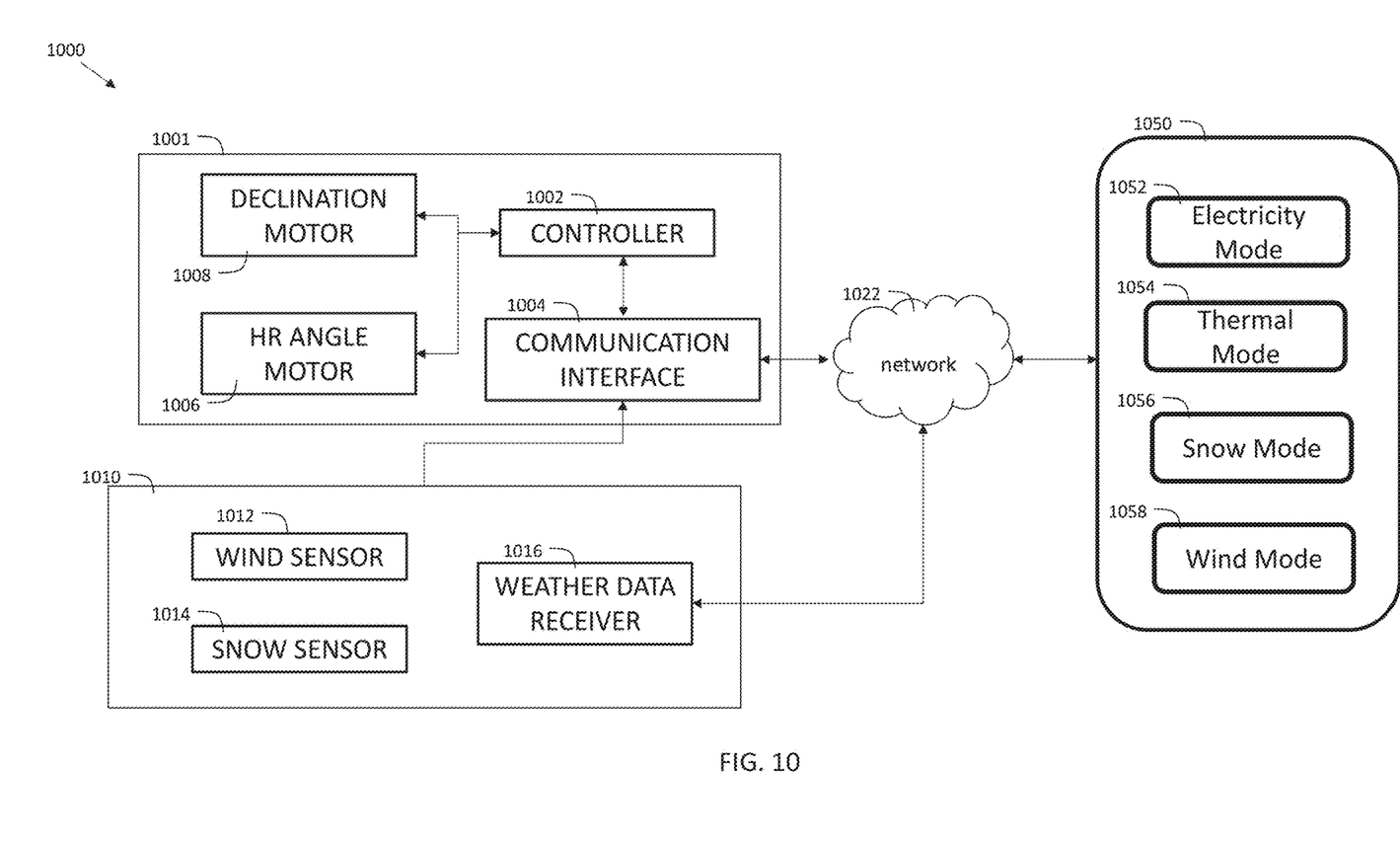
FIG. 10 is a block diagram showing components of embodiments of the present invention.

FIG. 10 is a block diagram 1000 showing components of embodiments of the present invention. A control system 1001 may include a controller 1002. Controller 1002 can be a microcontroller that includes a processing unit, memory for storing instructions that are executed by the processing unit, and input/output (I/O) interface, and/or other associated interfaces. The controller 1002 is configured to electronically control a hr-angle motor 1006. The hr-angle motor may be a stepper motor, or other suitable electric motor now known or hereafter developed. The hr-angle motor may also include a positional encoder to report position information back to the controller 1002. The controller 1002 is configured to electronically control a hr-angle motor 1006. The hr-angle motor may be a stepper motor, or other suitable electric motor. The hr-angle motor may also include a positional encoder to report position information back to the controller 1002. The hr-angle motor may operate on a daily basis to adjust the hr-angle of the panels by moving the lateral arms, to be as directly facing the sun as possible. At the end of a daylight period, the hr-angle motor may return the panels to the proper orientation for starting solar energy generation the following morning.

The controller 1002 is configured to electronically control a declination motor 1008. The declination motor may be a stepper motor, or other suitable electric motor now known or hereafter developed. The declination motor may also include a positional encoder to report position information back to the controller 1002. The declination motor 1008 can be used to adjust the orientation of the horizontal support beam to compensate for changes in solar declination throughout the year.

The controller 1002 may optionally include communication interface 1004. The communication interface can include a wireless communication interface such as a Wi-Fi communication interface, Bluetooth® communication interface, and/or other suitable communication interface. The communication interface 1004 can send and receive information via computer network 1022. In embodiments, network 1022 may include a local area network, wide area network, the Internet, or any other network now known or hereafter developed.

An electronic computing device 1050 can be used to control operation solar stands of disclosed embodiments via control system 1001. The electronic computing device can be a smartphone, tablet computer, laptop computer, desktop computer, server, or other suitable computing device now known or hereafter developed. The device 1050 can execute an application ('app') or software that can provide controls via user interface buttons. User interface button 1052, when invoked, causes the device 1050 to send a message via network 1022 to communication interface 1004 to orient for electricity generation, such as shown in FIG. 8. User interface button 1054, when invoked, causes the device 1050 to send a message via network 1022 to communication interface 1004 to orient for thermal generation, such as shown in FIG. 9. User interface button 1056, when invoked, causes the device 1050 to send a message via network 1022 to communication interface 1004 to orient for snow protection mode, such as shown in FIG. 5. User interface button 1058, when invoked, causes the device 1050 to send a message via network 1022 to communication interface 1004 to orient for wind protection mode, such as shown in FIG. 6. The user interface shown on device 1050 is exemplary, and other embodiments may include more, fewer, and/or different buttons and/or display of information. The term, "buttons," used herein may refer to any type of user interface, including a toggle, mouse, drop-down menu, radio button, etc. Buttons, accordingly, may be hardware or on a screen.

Some embodiments may optionally include an environmental detection system 1010. The environmental detection system 1010 may include a snow sensor 1014, wind sensor 1012, and/or weather data receiver 1016. In embodiments, the weather data receiver 1016 can include a "Specific Area Message Encoder" (SAME) weather data receiver. In some embodiments, the weather data receiver 1016 may retrieve local weather data from the Internet via network 1022. In embodiments, the wind sensor 1012, snow sensor 1014, and/or weather data receiver 1016 may be generated to output a signal under certain conditions, such as through a contact closure mechanism, or other suitable mechanism. In embodiments, the environmental detection system 1010 is installed remotely from, but near the control system 1001. In some embodiments, the environmental detection system 1010 is installed within 20 meters of the control system 1001.

As an example, when the wind exceeds a predetermined threshold, such as 50 miles per hour, then a signal from the wind sensor is sent to the communication interface 1004, which in turn provides an indication to the controller 1002. In response, the controller 1002 issues commands to the hr-angle motor 1006 and/or declination motor 1008 to move the solar panel stand to a configuration as shown in FIG. 6.

Similarly, when the snow exceeds a predetermined threshold, such as 1.25 pounds per square inch, then a signal from the snow sensor is sent to the communication interface 1004, which in turn provides an indication to the controller 1002. In response, the controller 1002 issues commands to the hr-angle motor 1006 and/or declination motor 1008 to move the solar panel stand to a configuration as shown in FIG. 5.

Alternatively, data from weather data receiver 1016 may be processed, and in response to forecast conditions exceeding a predetermined threshold, a message is sent to the control system 1001 to control the solar panel stand accordingly. As an example, in response to a forecast of high winds, the weather data receiver 1016 can issue a command to the control system 1001 to put the solar panel stand in a configuration such as shown in FIG. 6. Similarly, in response to a forecast of snow accumulation, the weather data receiver 1016 can issue a command to the control system 1001 to put the solar panel stand in a configuration such as shown in FIG. 5.

Some embodiments include a controller, the controller comprising a memory, the memory containing instructions, that when executed by the controller, cause the controller to electronically control the hr-angle motor. Some embodiments include a declination motor, wherein the controller is configured to electronically control the declination motor, and wherein the declination motor is mechanically coupled to the horizontal support beam. In some embodiments, the memory is a non-transitory computer-readable medium or non-transitory computer-readable hardware storage device.

Figure 11:
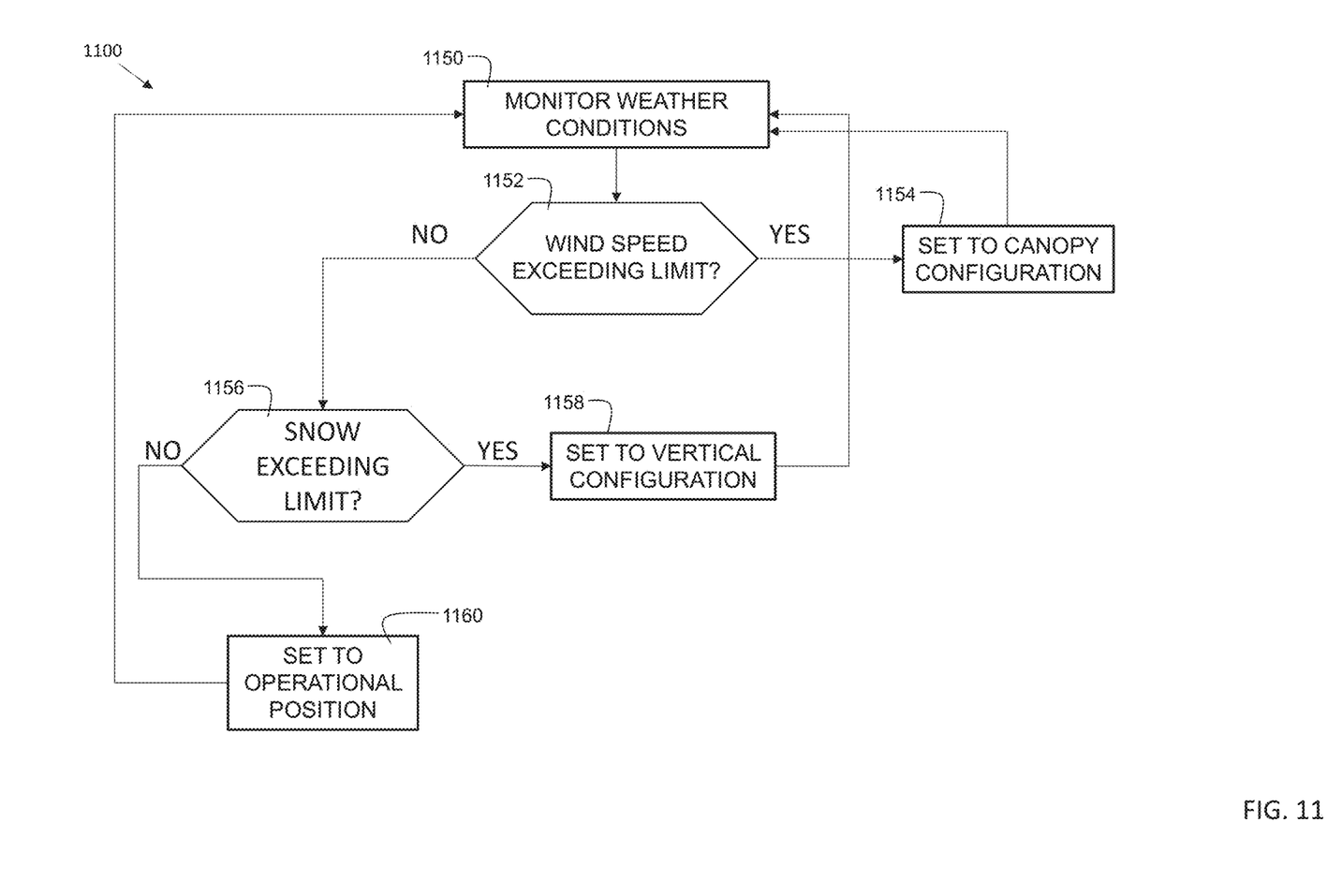
FIG. 11 is a flowchart for embodiments of the present invention.

FIG. 11 is a flowchart 1100 for embodiments of the present invention. In embodiments, this flowchart is implemented via controller 1002 of FIG. 10. At 1150, weather conditions are monitored. This can include monitoring information from environmental detection system 1010 of FIG. 10. The information can include actual and/or forecast meteorological information, including, but not limited to, wind speed information, snowfall information, and/or other relevant meteorological information. At 1152 a check is made to see if wind speed exceeds a predetermined level (e.g., exceeds 50 miles per hour), and/or is forecast to exceed a predetermined limit. If yes at 1152, then the process continues to 1154 where the solar panel stand is set to a canopy configuration such as shown in FIG. 6. If no at 1152, then the process continues to 1156 where a check is made if snow is exceeding a predetermined limit and/or forecast to exceed a predetermined limit. If yes at 1154, then the process continues to 1158 where the solar panel stand is set to a vertical configuration such as shown in FIG. 5. If no at 1156, then the solar panel stand is set to an operational position 1160, such as shown in FIG. 8 or FIG. 9. In this way, disclosed embodiments provide a solar panel stand that can protect itself from harsh environmental conditions in an automated manner, without any human intervention. The flow returns to monitoring weather conditions at 1150. When the weather conditions are within limits, the solar panel stand may revert to the operational position at 1160. Note that in some embodiments, wind speed or snow limits may not be included in the flow.

Figure 12:
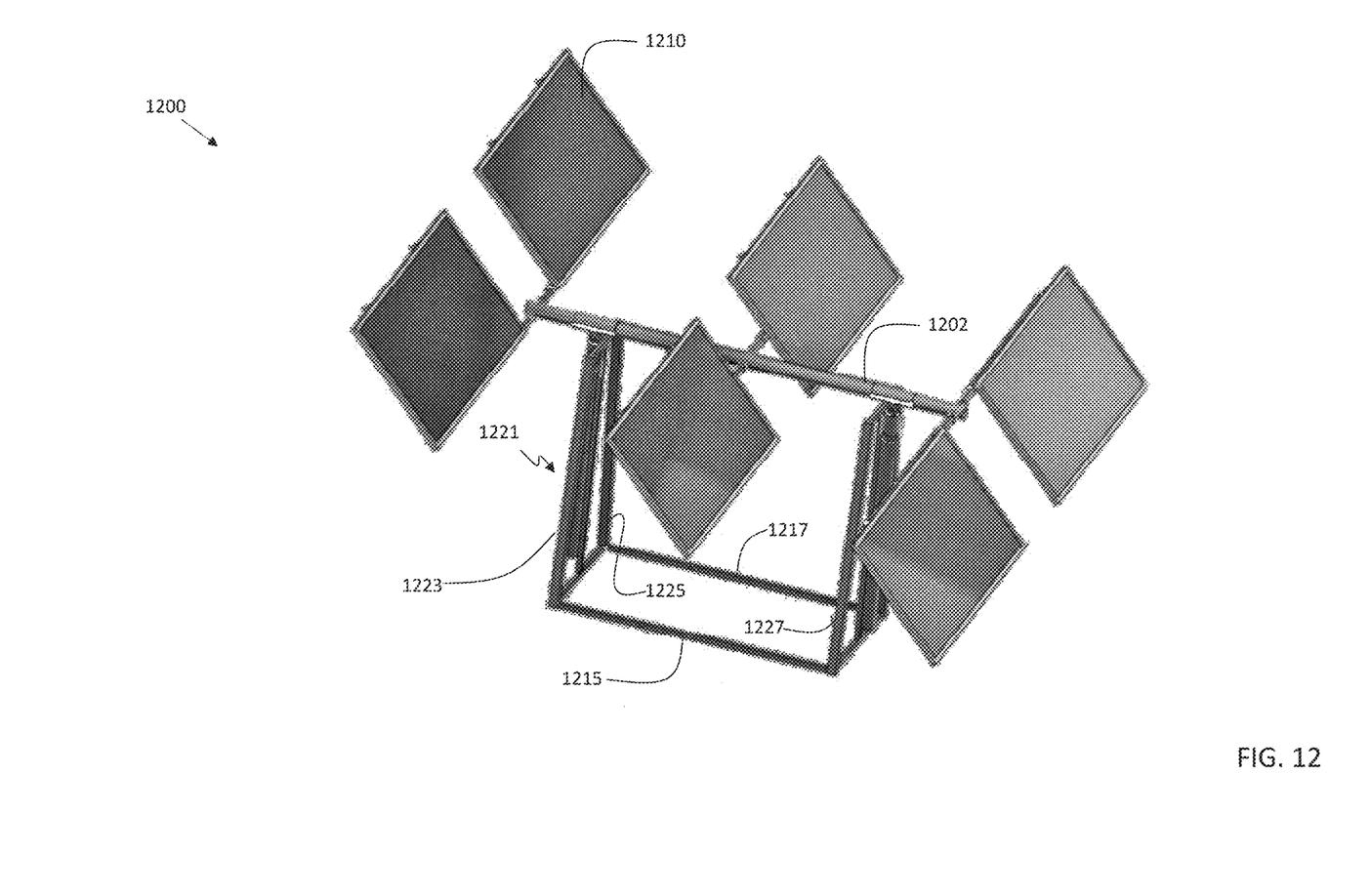
FIG. 12 shows a perspective view of a solar panel stand in accordance with additional embodiments of the present invention.

FIG. 12 shows an embodiment of the present invention mounted on an A-frame structure. A-frame structure 1221 can include horizontal support beam 1202 for securing of solar panels, indicated generally as 1210. The horizontal support beam 1202 is mounted on A-frame structure 1221. The A-frame structure 1221 can include additional vertical supports, some of which are indicated as 1223, 1225, and 1227, as well as additional support horizontal support beams 1215 and 1217 to provide additional rigidity to the A-frame. This embodiment enabled portable applications that can be rapidly deployed without needing to dig into the ground underneath.

Figure 13:
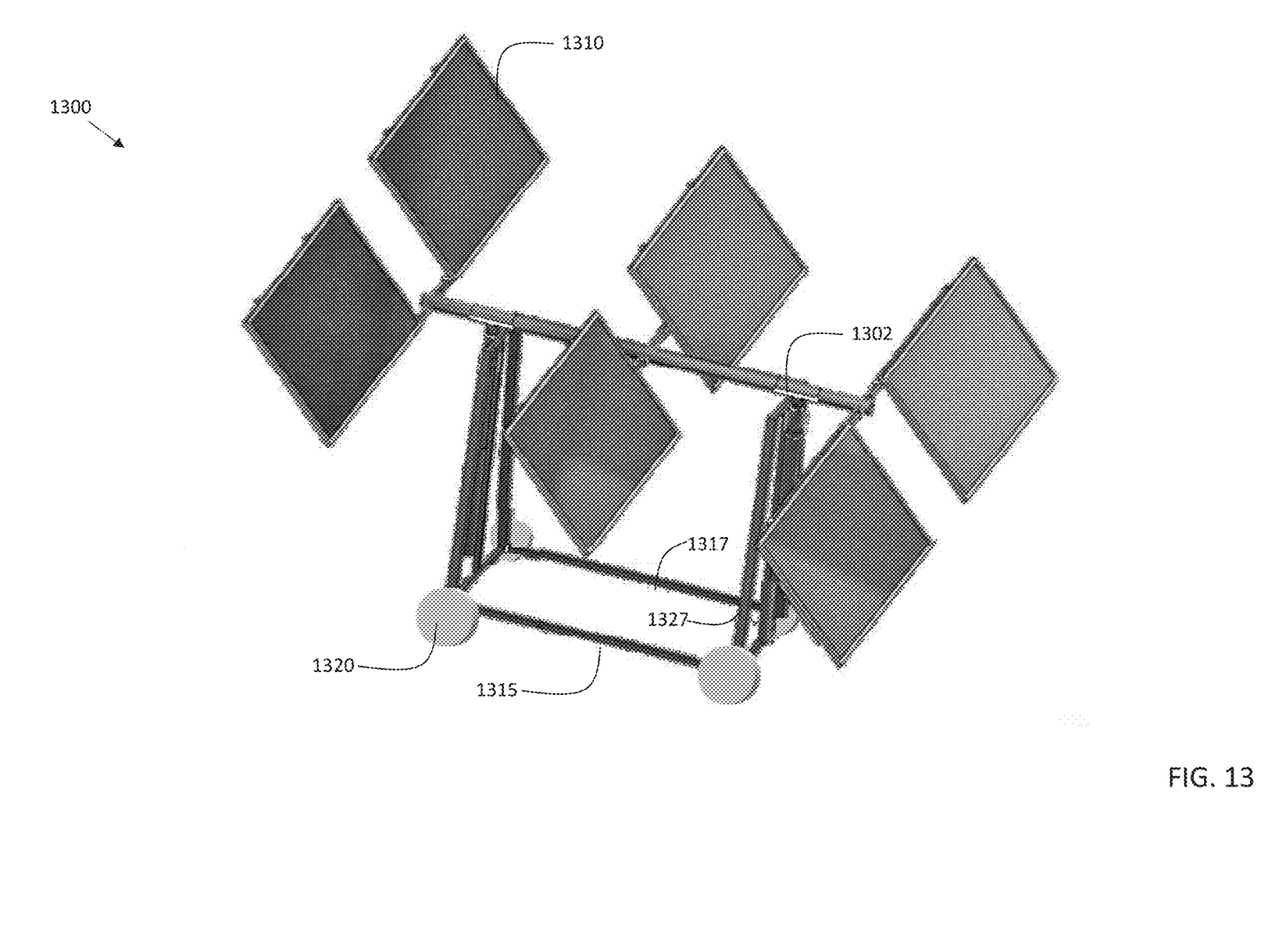
FIG. 13 shows a perspective view of a solar panel stand in accordance with additional embodiments of the present invention.

FIG. 13 shows an embodiment of the present invention mounted on a wheeled A-frame structure. A-frame structure 1321 is similar to the A-frame structure 1221 of FIG. 12, with the addition of one or more wheels disposed on the bottom of the A-frame structure, shown generally as 1320. The horizontal support beam 1302 is mounted on A-frame structure 1321. The A-frame structure 1321 can include horizontal support beam 1302 for securing of solar panels, indicated generally as 1310. The A-frame structure 1321 can include additional vertical supports, some of which are indicated as 1323, 1325, and 1327, as well as additional support horizontal support beams 1315 and 1317 to provide additional rigidity to the A-frame. This embodiment enabled portable applications that can be rapidly deployed by wheeling the structure to a desired location, without needing to dig into the ground underneath.

Embodiments can be made of a variety of materials. The vertical supports (104a and 104b of FIG. 1) can be comprised of metal, wood, fiberglass, PVC pipe, or other suitable material. The horizontal support beam 102 can be comprised of metal, plastic, fiberglass, or other suitable material. The lateral arms (312 of FIG. 3) can be comprised of metal, a composite material, or other suitable material. The panel frames (310 of FIG. 3) can be comprised of metal, a composite material, or other suitable material. Unless otherwise described herein, components of the invention are made from plastic, metal, composite, glass, or any other suitable material, now known or hereafter developed.

As can now be appreciated, disclosed embodiments provide an improved solar panel stand that provides biaxial tracking for improved solar energy generation efficiency, with reduced cost and complexity, enabling more off-grid and micro-grid energy generation capabilities.

Although embodiments of the invention have been described herein as systems and method, in some embodiments, the invention may include a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, and any suitable combination thereof. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the invention has been particularly shown and described in conjunction with exemplary embodiments, it will be appreciated that variations and modifications will occur to those skilled in the art. For example, where the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of the invention.

What is claimed is:

1. A solar panel stand, comprising:
a plurality of vertical supports;
a horizontal support beam moveably coupled to the plurality of vertical supports;
a plurality of lateral arms protruding from the horizontal support beam;
a plurality of panel frames moveably attached to each lateral arm of the plurality of lateral arms; and
a plurality of solar panels, wherein each solar panel of the plurality of solar panels is installed within a panel frame from the plurality of panel frames, and wherein each frame of the plurality of panel frames has a mounting offset that is unequal to a mounting offset of an adjacent solar panel of the plurality of solar panels, and wherein one panel frame from the plurality of panel frames is a centrally mounted panel frame that is mounted at a midpoint of the horizontal support beam, and wherein the centrally mounted panel has a mounting offset that is half a width of a panel frame, and wherein one panel frame from the plurality of panel frames is mounted at a first end of the horizontal support beam, and wherein the panel frame mounted at the first end of the horizontal support beam is mounted such that the panel frame does not extend above the horizontal support beam, and wherein one panel frame from the plurality of panel frames is mounted at a second end of the horizontal support beam, and wherein the panel frame mounted at the second end of the horizontal support beam is mounted such that the panel frame does not extend below the horizontal support beam.

2. The solar panel stand of claim 1, further comprising, a second plurality of solar panels, wherein each solar panel of the second plurality of solar panels is installed within a panel frame from the plurality of panel frames.

3. The solar panel stand of claim 2, wherein the plurality of solar panels comprises photovoltaic cells, and the second plurality of solar panels comprises thermodynamic panels.

4. The solar panel stand of claim 1, further comprising an hr-angle motor, the hr-angle motor mechanically coupled to the plurality of lateral arms.

5. The solar panel stand of claim 4, further comprising a controller, the controller comprising a processor, and a memory, the memory containing instructions, that when executed by the processor, cause the controller to electronically control the hr-angle motor.

6. The solar panel stand of claim 5, further comprising a declination motor, and wherein the controller is configured to electronically control the declination motor, and wherein the declination motor is mechanically coupled to the horizontal support beam.

7. The solar panel stand of claim 1, wherein the plurality of lateral arms is an odd number of lateral arms.

8. The solar panel stand of claim 7, wherein each solar panel of the plurality of solar panels is the same size.

9. The solar panel stand of claim 5, wherein the memory further contains instructions, that when executed by the processor, cause the solar panel stand to move to a canopy configuration, wherein each solar panel of the plurality of panels has a planar surface approximately parallel to a ground plane.

10. The solar panel stand of claim 5, wherein the memory further contains instructions, that when executed by the processor, cause the solar panel stand to move to a vertical configuration, wherein each solar panel of the plurality of panels has a planar surface approximately perpendicular to a ground plane.

11. The solar panel stand of claim 1, wherein a length of the horizontal support beam is defined by the plurality of lateral arms minus one, multiplied by a spacing factor, plus an overhead margin value.

* * * * *